(12) United States Patent
Braley

(10) Patent No.: US 11,338,554 B2
(45) Date of Patent: May 24, 2022

(54) COLOURED LAMINATED GLASS

(71) Applicant: SAINT-GOBAIN GLASS FRANCE, Courbevoie (FR)

(72) Inventor: Carole Braley, Choisy-au-Bac (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/493,629

(22) PCT Filed: Mar. 12, 2018

(86) PCT No.: PCT/FR2018/050566
§ 371 (c)(1),
(2) Date: Sep. 12, 2019

(87) PCT Pub. No.: WO2018/167412
PCT Pub. Date: Sep. 20, 2018

(65) Prior Publication Data
US 2020/0009836 A1   Jan. 9, 2020

(30) Foreign Application Priority Data

Mar. 14, 2017   (FR) ...................... 1752082

(51) Int. Cl.
*B32B 17/10* (2006.01)
*B32B 37/06* (2006.01)
(Continued)

(52) U.S. Cl.
CPC .......... *B32B 17/10201* (2013.01); *B32B 7/02* (2013.01); *B32B 17/10036* (2013.01);
(Continued)

(58) Field of Classification Search
CPC ......... B32B 17/00–17/1099; B32B 7/00–7/14; C03C 17/00–17/44; G02B 5/00–5/32
See application file for complete search history.

(56) References Cited

U.S. PATENT DOCUMENTS 5,891,556 A * 4/1999 Anderson ......... B32B 17/10036
204/192.15
6,055,088 A   4/2000 Fix et al.
(Continued)

FOREIGN PATENT DOCUMENTS

EP   0 825 478 A1   2/1998
JP   2010-180090 A   8/2010
(Continued)

OTHER PUBLICATIONS

Machine translation of WO2014010401. Retrieved Oct. 23, 2020.*
(Continued)

*Primary Examiner* — Prashant J Khatri
(74) *Attorney, Agent, or Firm* — Oblon, McClelland, Maier & Neustadt, L.L.P.

(57) ABSTRACT

A decorative laminated glass includes a first glass sheet, a second glass sheet, and a colored lamination interlayer between the first glass sheet and the second glass sheet. A coating is positioned between the first glass sheet and the lamination interlayer, and in direct contact with the first glass sheet. The coating is formed by the series of the following layers, starting from the surface of the first glass sheet: optionally, a first stack of dielectric layers; a layer based on titanium oxide having a thickness of from 5 to 70 nm; and optionally, a second stack of dielectric layers.

13 Claims, 1 Drawing Sheet

Figure 1:
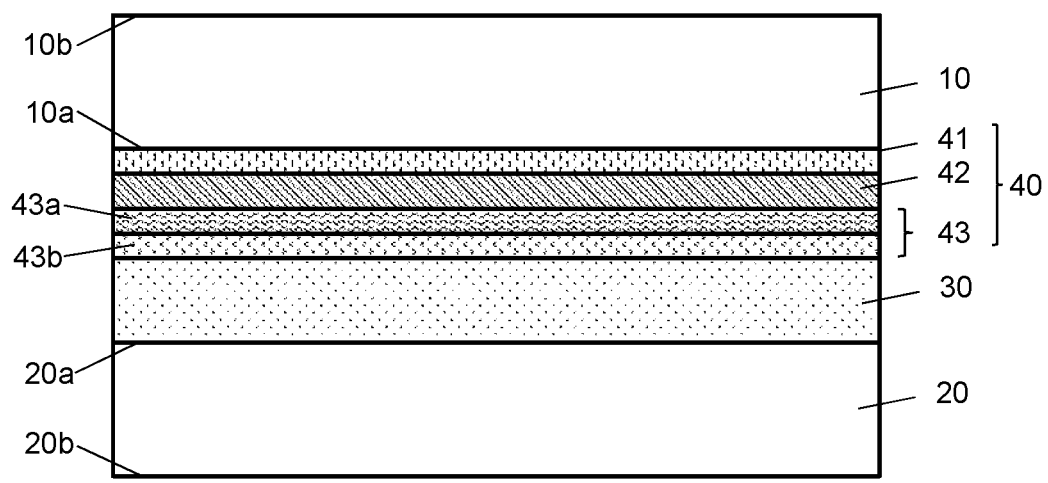

(51) Int. Cl.
  *B32B 37/18* (2006.01)
  *C03C 17/34* (2006.01)
  *E04F 11/18* (2006.01)
  *E04F 13/14* (2006.01)
  *E06B 3/66* (2006.01)
  *E06B 9/24* (2006.01)
  *B32B 7/02* (2019.01)

(52) U.S. Cl.
  CPC .. *B32B 17/10275* (2013.01); *B32B 17/10651* (2013.01); *B32B 17/10935* (2013.01); *B32B 37/06* (2013.01); *B32B 37/182* (2013.01); *C03C 17/3435* (2013.01); *E04F 11/1853* (2013.01); *E04F 13/14* (2013.01); *E06B 3/6608* (2013.01); *E06B 9/24* (2013.01); *B32B 2255/20* (2013.01); *B32B 2255/28* (2013.01); *B32B 2307/4023* (2013.01); *B32B 2307/4026* (2013.01); *B32B 2307/42* (2013.01); *B32B 2315/08* (2013.01); *B32B 2419/00* (2013.01); *C03C 2217/732* (2013.01); *C03C 2218/156* (2013.01); *Y10T 428/24967* (2015.01)

(56) References Cited

U.S. PATENT DOCUMENTS

| | | | |
|---|---|---|---|
| 6,466,298 | B1 | 10/2002 | Fix et al. |
| 7,842,395 | B2 * | 11/2010 | Lu .................... B32B 17/10761 |
| | | | 428/525 |
| 2006/0078716 | A1 | 4/2006 | Yacovone |
| 2009/0162671 | A1 * | 6/2009 | Marumoto ............. C08K 5/521 |
| | | | 428/437 |
| 2011/0300356 | A1 | 12/2011 | Takamatsu et al. |
| 2017/0204001 | A1 * | 7/2017 | Maillet ................ C03C 17/225 |

FOREIGN PATENT DOCUMENTS

| WO | WO 2014/010401 A1 | 1/2014 | |
|---|---|---|---|
| WO | WO-2015145073 A1 * | 10/2015 | ........... C03C 17/245 |

OTHER PUBLICATIONS de la Torre et al. "Phthalocyanines: old dyes, new materials. Putting color in nanotechnology", Chemical Communications, (2007); pp. 2000-2015.*
International Search Report dated Jun. 1, 2018 in PCT/FR2018/050566 filed Mar. 12, 2018.

* cited by examiner

COLOURED LAMINATED GLASS

The present invention relates to the field of decorative glass panels. More particularly, it targets decorative panels for interior applications such as office partitioning, wall coverings, credenzas, doors and balustrades, or exterior applications such as facade glazing, privacy screens and brise soleils.

Glass is a material widely used by architects both for the interior design of buildings and for the exterior covering thereof. There is consequently a constant demand for new products that make it possible to obtain the esthetic rendering desired by architects.

Laminated glazings are commonly used in the field of construction for their property of being "safety" glazings. They are formed of two glass sheets linked together by a lamination interlayer.

When it is desired to obtain colored laminated glass, one of the options consists in using a lamination interlayer which is itself colored. The coloration is thus provided during the process for manufacturing the interlayer. This solution is not very flexible for the end user. The coloration (degree of tint and choice of the color) is specifically imposed by the manufacturer of the interlayer and the choice remains limited. In fact, the development of new tints remains problematic for the manufacturer and requires significant formulation adaptation work in order to continue to meet the client specifications. Specifically, the changing of one component or of the proportions of the components in the formulation of the interlayer can adversely affect the performance of the additives and/or the properties of the final product. Even more so when it is desired to obtain deep hues, and therefore to considerably increase the proportions of colorants in the interlayer. Even though it can be envisaged, the provision of tailor-made colored interlayers therefore remains expensive.

It is also possible to produce digital printing on a lamination interlayer before the insertion thereof into a laminated glass. This method makes it possible to reproduce a wide variety of complex designs for decorative purposes or communication purposes (regarding logos for example). However, the laminated glasses that incorporate printed interlayers do not generally have sufficient contrast between the colors, in particular between light colors, to enable satisfactory distinction of the designs, in particular when they are displayed outside, for example as a facade of buildings.

The present invention proposes a decorative glass panel that makes it possible to obviate the above drawbacks. More particularly, the present invention relates to a laminated glass comprising a first glass sheet, a second glass sheet and a colored lamination interlayer between the first glass sheet and the second glass sheet, characterized in that a coating is positioned between the first glass sheet and the lamination interlayer, said coating being formed by the series of the following layers, starting from the surface of the first glass sheet:
  optionally, a first stack of dielectric layers;
  a layer based on titanium oxide; and
  optionally, a second stack of dielectric layers.

The laminated glass according to the invention makes it possible to broaden the choice of esthetic solutions available without intervening in the formulation of the lamination intermediary. In particular, the present invention makes it possible to offer a range of laminated glasses having deeper colors using ranges of colored lamination interlayers that are already available. Furthermore, the present invention also makes it possible to increase the contrast between the various shades, in particular the light shades. The increase in the contrast is particularly appreciated for improving the visibility of designs, in particular outside, whether these designs are obtained using printed lamination interlayers or from combinations of plain laminated glass panels of different colors.

The laminated glass according to the invention comprises a first glass sheet and a second glass sheet that each have an inner surface in contact with the lamination interlayer and an outer surface opposite said inner surface. The first and second glass sheets are preferably sheets of flat glass, in particular sheets of float glass, i.e. having a smooth inner surface and a smooth outer surface. For the purposes of the present invention, a "smooth surface" is understood to mean a surface for which the surface irregularities are such that incident radiation on the surface is not significantly deflected by these surface irregularities. In some embodiments, the outer surface of at least one of the first or second glass sheets—optionally of each of the first and second glass sheets—may be partially or completely textured. For the purposes of the present invention, a "textured surface" is understood to mean a surface for which the surface finish varies on a scale greater than the wavelength of the incident radiation on the surface, so that the incident radiation is transmitted and reflected diffusely by the surface. Such texturing may be obtained by any known texturing process, for example by embossing the inner surface of the glass sheet preheated to a temperature at which it is possible to deform it, in particular by rolling using a roller having on its surface a texturing complementary to the texturing to be formed on the inner surface of the glass sheet; by abrasion using abrasive particles or surfaces, in particular by sandblasting; by chemical treatment, in particular acid treatment; or by etching, optionally using masks to protect at least one portion of the surface of the substrate that is not textured.

The first and second glass sheets are generally sheets of clear or extra-clear glass. In some embodiments, they may however be made, on the contrary, of a tinted glass, such as a yellow, blue, green, gray or bronze glass. They typically each have a thickness of from 2 to 20 mm, in particular 3 to 12 mm, for example 4, 6, 8 or 10 mm.

The coating positioned between the first glass sheet and the lamination interlayer is generally in direct contact with the inner surface of the first glass sheet. It is preferably also in direct contact with the lamination interlayer. Moreover, the second glass sheet is preferably in direct contact with the lamination interlayer. For the purposes of the present invention, an element A "in direct contact" with an element B means that no other element is positioned between said elements A and B. On the contrary, an element A "in contact" with an element B does not exclude the presence of another element between said elements A and B.

The coating is formed by the series, starting from the inner surface of the first glass sheet, optionally of a first stack of dielectric layers, of a layer based on titanium oxide, and optionally of a second stack of dielectric layers. Here, the expression "formed by" indicates that the coating does not comprise layers other than those listed above. In other words, the layer based on titanium oxide is in direct contact, on the one hand, with the first stack of dielectric layers and, on the other hand, with the second stack of dielectric layers. Besides the layer based on titanium oxide, the coating according to the invention therefore comprises only layers formed of dielectric materials. In particular it does not comprise metal layers, in particular based on silver, platinum, palladium, gold, copper or else nickel, of NiCr type. Preferably, the coating according to the invention does not comprise layers made of metal nitride either, in particular of TiN, NbN or CrN type. In one preferred embodiment, the coating is formed by the series, starting from the inner surface of the first glass sheet, of a first stack of dielectric layers, of a layer based on titanium oxide, and of a second stack of dielectric layers.

The expression "based on" with reference to the composition of a layer means that said layer comprises more than 60%, preferably more than 80%, more preferentially more than 90%, or even more than 95% by weight of the material in question. The layer in question may in particular be essentially formed of said material, that is to say comprising more than 99% by weight of said material.

In the coating according to the invention, the layer based on titanium oxide may in particular comprise silicon. In this case, the Si/Ti overall atomic ratio in said titanium-based layer is preferably from 0.01, or even 0.05, to 0.25, or even 0.20 or 0.15. The Si/Ti ratio is preferably homogeneous throughout the thickness of the titanium-based layer. Furthermore, the atoms of silicon and of titanium preferably represent at least 90%, or even at least 95%, at least 97%, or even all of the atoms other than oxygen in said titanium-based layer.

The layer based on titanium oxide generally has a physical thickness of from 5 to 70 nm, preferably from 20 to 50 nm. When none of the first and second stacks of dielectric layers is present, the layer based on titanium oxide preferably has a physical thickness of from 20 to 50 nm. When the first and second stacks of dielectric layers are present, the oxide-based layer preferably has a physical thickness of from 10 to 50 nm.

For the purposes of the present invention, the expression "dielectric layer" denotes a nonmetallic layer, i.e. which is not formed of metal. This expression in particular denotes a layer formed of a material having a ratio between the refractive index and the extinction coefficient (n/k) over the entire wavelength range of the visible spectrum (from 380 nm to 780 nm) that is equal to or greater than 5.

The dielectric layers of the first stack of dielectric layers and of the second stack of dielectric layers are preferably independently chosen from layers based on oxides of zinc, silicon, tin, titanium, zirconium, niobium and of mixtures thereof, on nitrides of silicon and/or of aluminum, and on oxynitrides of silicon and/or of aluminum.

The first and second stacks of dielectric layers may independently comprise from 1 to 5 dielectric layers, for example 1, 2 or 3 dielectric layers. The coating may thus comprise in total from 3 to 11 layers, for example 3, 4, 5, 6 or 7 layers.

The overall optical thickness of the first stack of dielectric layers is typically from 10 to 150 nm, preferably 20 to 120 nm, for example from 20 to 40 nm, from 70 to 90 nm or from 90 to 110 nm. The overall optical thickness of a stack is understood to mean the sum of the optical thicknesses of each of the layers forming the stack, the optical thickness of a layer being defined by the product of the physical thickness of a layer and the refractive index thereof.

In one particular embodiment, the first stack of dielectric layers is formed of two dielectric layers, in particular, successively starting from the first glass sheet, a first layer based on silicon oxide and a second layer based on silicon nitride. Preferably, the first layer has an optical thickness of from 5 to 50 nm, or even 15 to 30 nm and the second layer has an optical thickness from 20 to 150 nm, or even 50 to 100 nm.

In another particular embodiment, the first stack of dielectric layers is formed of a single layer, in particular a layer based on silicon nitride or on silicon oxide. The single layer preferably has an optical thickness of from 20 to 120 nm, preferably 50 to 100 nm.

The overall optical thickness of the second stack of dielectric layers is typically from 5 to 50 nm, preferably from 10 to 25 nm.

In one embodiment, the second stack of dielectric layers is formed of two dielectric layers, in particular, successively starting from the first glass sheet, of a first layer based on silicon oxide and of a second layer based on titanium oxide. Preferably, the first layer has an optical thickness of from 5 to 20 nm, or even 7 to 15 nm and the second layer has an optical thickness of from 2 to 10 nm, or even 3 to 7 nm.

The second glass sheet may be coated on its outer surface, that is to say on the face of the second glass sheet which is not in contact with the lamination interlayer, with an antireflection coating. The antireflection coating is typically formed of a series, starting from the surface of the glass, of high refractive index layers and low refractive index layers. The antireflection coating may in particular be formed, starting from the surface of the glass, by a first high refractive index layer, in particular based on silicon nitride, a first low refractive index layer, in particular based on silicon oxide, a second high refractive index layer, in particular based on silicon nitride, and a second low refractive index layer, in particular based on silicon oxide. Such antireflection coatings are described for example in EP 1206715 or EP 1519902.

The lamination interlayer is a sheet made of thermoformable or pressure-sensitive polymer material. It may be, in particular, a lamination interlayer based on polyvinyl butyral (PVB), ethylene-vinyl acetate (EVA), polyurethane (PU), polyethylene terephthalate (PET) or polyvinyl chloride (PVC). A lamination interlayer based on PVB is preferred.

The lamination interlayer is colored on at least one portion of its surface. In a first embodiment, the lamination interlayer is colored over the whole of its surface, preferably uniformly. In this case, they are preferably bulk-colored interlayers. In another embodiment, the lamination interlayer may be a printed lamination interlayer, in particular comprising colored designs, optionally encapsulated between two colorless lamination interlayers.

The lamination interlayer generally has a thickness of the order of from 0.2 to 1.5 mm, for example around 0.76 mm. The laminated glass according to the invention may comprise several lamination interlayers, for example 2 or 3, identical or different lamination interlayers.

FIG. 1 illustrates an embodiment of decorative laminated glass according to the present invention. The first glass sheet 10 and the second glass sheet 20 each have an inner surface 10a, respectively 20a, and an outer surface 10b, respectively 20b. In this embodiment, the inner and outer surfaces of the first and second glass sheets are smooth. A lamination interlayer 30 is positioned between the first and second glass sheets 10 and 20. A coating 40 formed of a first stack of dielectric layers 41, of a layer based on titanium oxide 42, and of a second stack of dielectric layers 43. In this embodiment, the first stack of dielectric layers 41 is formed of a single layer, for example based on silicon nitride, and the second stack of dielectric layers 43 is formed of two layers, a first dielectric layer 43a, for example based on silicon oxide, and a second dielectric layer 43b, for example based on titanium oxide.

An example of a process for manufacturing the decorative laminated glass according to the invention comprises:
the provision of a first glass sheet coated with a coating, of a colored lamination interlayer, and of a second glass sheet, said coating being formed by the series of the following layers, starting from the surface of the glass:
optionally, a first stack of dielectric layers;
a layer based on titanium oxide; et
optionally, a second stack of dielectric layers;
the successive positioning, with regard to the first glass sheet, of the lamination interlayer and of the second glass sheet, so as to have the coating in contact with the lamination interlayer; and
the heating of the laminated structure thus formed at a temperature above the glass transition temperature of the lamination interlayer.

The coating according to the invention is deposited on the inner surface of the first glass sheet, preferably under vacuum, by magnetic field assisted sputtering (referred to as magnetron sputtering).

The decorative laminated glass according to the invention may be flat glass or curved glass. It may be used both for the interior design of buildings and for the exterior covering thereof. Applications in the interior design of buildings include for example office partitioning, wall coverings, credenzas, doors and balustrades. Applications in the exterior covering of buildings include for example facade glazing, privacy screens, brise soleils and balustrades. Thus, the present invention also relates to an article comprising a laminated glass as described above, said article being chosen from office partitions, wall coverings, credenzas, doors, balustrades, facade glazing, privacy screens and brise soleils.

The invention is illustrated with the aid of the following nonlimiting examples.

EXAMPLE 1

A decorative laminated glass I1 according to the invention, as illustrated in FIG. 1, was prepared from 4 mm thick PLANICLEAR glass sheets sold by the Applicant. A coating formed of a glass/$Si_3N_4$ (30 nm)/$TiO_2$ (22 nm)/$SiO_2$ (7 nm)/$TiO_2$ (1 nm) stack was deposited by magnetron sputtering on the inner surface of the first glass sheet. The thicknesses indicated between parentheses correspond to the physical thicknesses. The coated first glass sheet was then laminated with the uncoated second glass sheet with the aid of a Vanceva® True Blue colored PVB lamination intermediary by positioning the coated face of the first glass sheet in contact with the lamination intermediary.

A laminated glass I2 according to the invention was prepared in the same way as the glass I1 except that the second glass sheet has a glass/$Si_3N_4$ (18 nm)/$SiO_2$ (28 nm)/$Si_3N_4$ (102 nm)/$SiO_2$ (90 nm) antireflection coating on its outer surface.

In comparison, a laminated glass C1 was prepared in an identical manner to the laminated glasses I1 and I2, except that none of the first and second glass sheets has a coating.

Measurements of color in reflection and of light transmission (LT) were carried out on each of the laminated glasses I1, I2 and C1 with the aid of a Minolta CM5 colorimeter (illuminant D65, 2° observer, specular reflection included). The measurements of color in reflection, expressed in the CIE L*a*b* system, are performed on the outer surface of the second glass sheet (surface 20b with reference to FIG. 1). The measurements of LT correspond to the light transmission from the outer surface of the second glass sheet to the outer surface of the first glass sheet (from the surface 20b to the surface 10b with reference to FIG. 1). The results are summarized in table 1.

TABLE 1

|    | L*   | a*   | b*    | LT   |
|----|------|------|-------|------|
| C1 | 25.8 | 3.1  | −6.8  | 11.7 |
| I1 | 27.5 | 8.0  | −17.6 | 10.0 |
| I2 | 14.1 | 18.4 | −33.0 | 10.4 |

The laminated glass according I1 to the invention has higher a* and b* coordinates, as absolute values, than the laminated glass C1, which results in a more intense color, while having a substantially equivalent LT. This effect is even more pronounced for the glass I2 according to the invention.

EXAMPLE 2

A laminated glass I3 according to the invention was prepared in an identical manner to the glass I1 except that the PVB used is formed of three zones: a colorless first zone, a yellow (Vanceva® Sahara Sun) second zone and an orange (Vanceva® Tangerine) third zone.

In comparison, a laminated glass C2 was prepared in an identical manner to the laminated glass I3, except that the first glass sheet has no coating.

The measurements of color in reflection, expressed in the CIE L*a*b* system, are carried out with the aid of a Minolta CM5 colorimeter on the outer surface of the second glass sheet (surface 20b with reference to FIG. 1), for each of the colorless, yellow and orange zones of the glasses I3 and C2. The differences in color between the colorless and yellow zones ($\Delta E^*_{i/j}$), colorless and orange zones ($\Delta E^*_{i/o}$), and yellow and orange zones ($\Delta E^*_{j/o}$) were calculated. A high $\Delta E^*$ denotes a significant difference in tint. The results are summarized in table 1.

TABLE 2

|    | zone      | L*   | a*    | b*   | $\Delta E^*_{i/j}$ | $\Delta E^*_{i/o}$ | $\Delta E^*_{j/o}$ |
|----|-----------|------|-------|------|------|------|------|
| C2 | Colorless | 33.1 | −1    | −0.4 | 7.9  | 9.3  | 11.0 |
|    | Yellow    | 33.5 | −4.5  | 6.7  |      |      |      |
|    | Orange    | 30.9 | 6.1   | 5.2  |      |      |      |
| I3 | Colorless | 52.9 | −2.8  | −2.9 | 25.8 | 32.5 | 32.5 |
|    | Yellow    | 52   | −11.8 | 21.3 |      |      |      |
|    | Orange    | 39.5 | 18    | 18.2 |      |      |      |

The $\Delta E^*_{i/j}$, $\Delta E^*_{i/o}$, and $\Delta E^*_{j/o}$ values are markedly higher for the laminated glass I3 according to the invention compared to the laminated glass C2. The various colorless, yellow and orange zones consequently appear more contrasted and better defined for the laminated glass according to the invention.

The invention claimed is:
1. A laminated glass comprising:
a first glass sheet, a second glass sheet, and a colored lamination interlayer between the first glass sheet and the second glass sheet,
wherein a coating is positioned between the first glass sheet and the lamination interlayer, and in direct contact with the first glass sheet, said coating comprising the following layers, starting from a surface of the first glass sheet:
a first stack of one or more dielectric layers, wherein the overall optical thickness of the first stack of dielectric layers is from 20 to 120 nm;
a layer based on titanium oxide having a physical thickness of from 5 to 70 nm; and a second stack of one or more dielectric layers, wherein the overall optical thickness of the second stack of dielectric layers is from 5 to 50 nm, wherein the layer based on titanium dioxide is between the first and second stacks of dielectric layers.

2. The laminated glass as claimed in claim 1, wherein the second glass sheet is in direct contact with the lamination interlayer.

3. The laminated glass as claimed in claim 1, wherein the physical thickness of the layer based on titanium oxide is from 20 to 50 nm.

4. The laminated glass as claimed in claim 1, wherein said layer based on titanium oxide comprises silicon.

5. The laminated glass as claimed in claim 4, wherein a Si/Ti overall atomic ratio in said titanium-based layer is from 0.01 to 0.25.

6. The laminated glass as claimed in claim 4, wherein, in the layer based on titanium oxide, the atoms of silicon and of titanium represent at least 90% of the atoms other than oxygen.

7. The laminated glass as claimed in claim 1, wherein the first stack of dielectric layers and the second stack of dielectric layers are formed of one or more dielectric layers independently selected from the group consisting of layers based on oxides of zinc, silicon, tin, titanium, zirconium, niobium and of mixtures thereof, layers based on nitrides of silicon and/or of aluminum, and layers based on oxynitrides of silicon and/or of aluminum.

8. The laminated glass as claimed in claim 1, wherein the first stack of dielectric layers is formed of two dielectric layers, the first layer being based on silicon oxide and the second layer being based on silicon nitride.

9. The laminated glass as claimed in claim 1, wherein the first stack of dielectric layers is formed of a single layer based on silicon nitride or on silicon oxide.

10. The laminated glass as claimed in claim 1, wherein the second stack of dielectric layers is formed of two layers, the first layer being based on silicon oxide and the second layer being based on titanium oxide.

11. The laminated glass as claimed in claim 1, wherein an antireflection coating is positioned on the outer face of the second glass sheet.

12. An article comprising:
the laminated glass as claimed in claim 1, said article being chosen from office partitions, wall coverings, credenzas, doors, balustrades, facade glazing, privacy screens and brise soleils.

13. A process for manufacturing a laminated glass as claimed in claim 1, comprising:
providing a first glass sheet coated with a coating in direct contact with the first glass sheet, said coating comprising a series of the following layers, starting from the surface of the glass: a first stack of one or more dielectric layers, wherein the overall optical thickness of the first stack of dielectric layers is from 20 to 120 nm; a layer based on titanium oxide having a physical thickness of from 5 to 70 nm; and a second stack of one or more dielectric layers, wherein the overall optical thickness of the second stack of dielectric layers is from 5 to 50 nm, wherein the layer based on titanium dioxide is between the first and second stacks of dielectric layers;
positioning, with regard to the first glass sheet, a lamination interlayer and a second glass sheet, so as to have the coating in contact with the lamination interlayer and the lamination interlayer in contact with the second glass sheet to form a laminated structure; and
heating the laminated structure at a temperature above the glass transition temperature of the lamination interlayer to form the laminated glass.

* * * * *